(No Model.)

E. TUSH.
TOOTH FOR HORSE HAY RAKES.

No. 397,155. Patented Feb. 5, 1889.

Witnesses.
M. A. Barnes.
Van Buren Hillyard.

Inventor:
Elwood Tush
By R. S. & A. P. Lacey
Attys.

UNITED STATES PATENT OFFICE.

ELWOOD TUSH, OF MANCHESTER, IOWA.

TOOTH FOR HORSE HAY-RAKES.

SPECIFICATION forming part of Letters Patent No. 397,155, dated February 5, 1889.

Application filed December 20, 1887. Serial No. 258,471. (No model.)

*To all whom it may concern:*

Be it known that I, ELWOOD TUSH, a citizen of the United States, residing at Manchester, in the county of Delaware and State of Iowa, have invented certain new and useful Improvements in Teeth for Horse Hay-Rakes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to teeth for horse hay-rakes, and has for its object the provision of a tooth that will occupy or cover a large area in cross-section, and which will be flexible throughout its length and capable of yielding in every direction.

The improvement consists in having the tooth formed of a wire which is coiled from one end to the other end of the tooth, the coils touching throughout the length of the tooth to mutually brace one another and prevent the entrance of hay, dirt, &c., between them.

Figure 1:
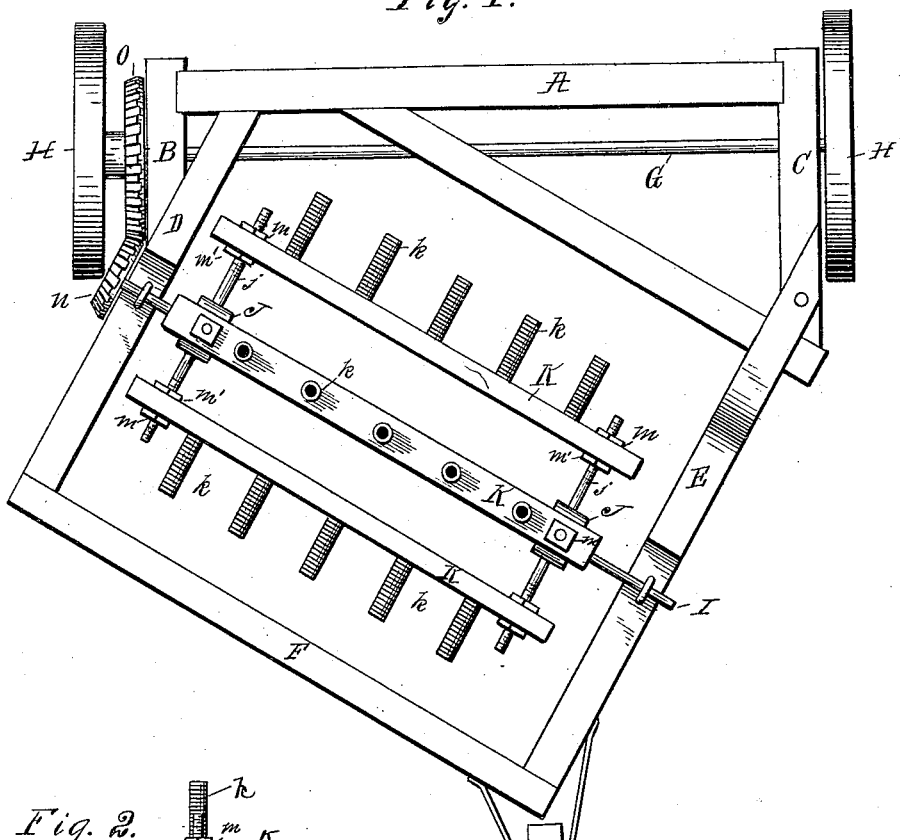
Figure 2:
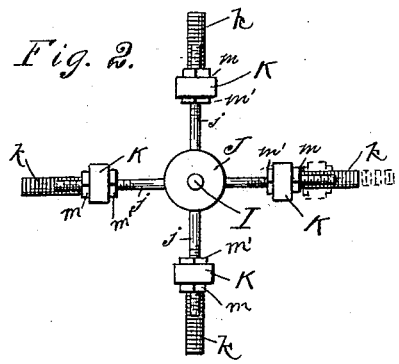
Figure 3:
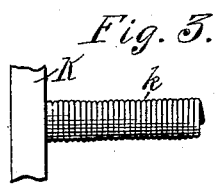

In the drawings, Figure 1 is a plan view of a horse hay-rake embodying my invention; Fig. 2, an end view of the rake; and Fig. 3, a detail view of a portion of a rake-bar, showing a rake-tooth on an enlarged scale.

The frame of the machine is of ordinary construction, being composed of the rear sill, A, the side beams, D and E, the fron tbar, F, the braces B and C, and the axle G, having the wheels H on its ends. The rake, composed of the shaft I, the hubs J, having the arms $j$, and the rake-bars K, mounted on the ends of the arms $j$ and held between the nuts $m$ and $m'$, and provided with the rake-teeth $k$, is journaled at its ends in the side beams, D and E, and receives its motion from the axle G by means of the gear-wheel O on the axle and the pinion $n$ on the rake-shaft.

The rake-teeth $k$ are composed of wires or rods coiled spirally from end to end, the coils touching throughout the length of the teeth to exclude dirt and prevent hay being caught between them. A tooth thus constructed can be made of comparatively light wire, and will occupy a large area in cross-section, and will be flexible throughout its length and yield in every direction to avoid obstructions, being sufficiently rigid to perform its work in an efficient manner. The coils touching throughout the length of the tooth, in addition to the exclusion of foreign substances between them, admits of the tooth being made of light wire, because the said coils mutually brace one another.

Having thus described my invention, what I claim, and desire to secure by Letters Patent, is—

The herein-described rake-tooth, composed of a wire coiled from end to end of the tooth, the coils touching throughout the length of the tooth, substantially as and for the purpose specified.

In testimony whereof I affix my signature in presence of two witnesses.

ELWOOD TUSH.

Witnesses:
JOHN CRUISE, Jr.,
F. H. PAUL.